US008121746B2

(12) United States Patent
François et al.

(10) Patent No.: US 8,121,746 B2
(45) Date of Patent: Feb. 21, 2012

(54) METHOD AND A DEVICE FOR MONITORING THE MINIMUM FLYING ALTITUDE OF AN AIRCRAFT

(75) Inventors: Gilles François, Toulouse (FR); Nicolas Marty, Saint Sauveur (FR); Frédéric Thomas, Toulouse (FR)

(73) Assignee: Thales (FR)

( * ) Notice: Subject to any disclaimer, the term of this patent is extended or adjusted under 35 U.S.C. 154(b) by 1304 days.

(21) Appl. No.: 11/689,460

(22) Filed: Mar. 21, 2007

(65) Prior Publication Data
US 2007/0250223 A1    Oct. 25, 2007

(30) Foreign Application Priority Data

Mar. 21, 2006  (FR) ..................................... 06 02455

(51) Int. Cl.
*G05D 1/08*        (2006.01)

(52) U.S. Cl. ............. 701/4; 701/1; 701/3; 701/5; 701/6; 701/7; 701/8; 701/9; 701/14; 701/15; 701/16; 701/18

(58) Field of Classification Search ........................ None
See application file for complete search history.

(56) References Cited

U.S. PATENT DOCUMENTS

| | | | | |
|---|---|---|---|---|
| 4,224,669 A | * | 9/1980 | Brame ............................... 701/8 |
| 4,646,244 A | * | 2/1987 | Bateman et al. ............... 701/301 |
| 4,910,674 A | * | 3/1990 | Lerche ........................... 701/200 |
| 5,047,777 A | * | 9/1991 | Metzdorff et al. ............... 342/64 |
| 5,196,847 A | * | 3/1993 | Bateman ....................... 340/970 |
| 5,442,556 A | * | 8/1995 | Boyes et al. ....................... 701/9 |
| 5,515,287 A | * | 5/1996 | Hakoyama et al. ............ 701/301 |
| 5,519,392 A | * | 5/1996 | Oder et al. ................. 340/995.27 |
| 5,526,000 A | * | 6/1996 | Chazelle et al. ................ 342/407 |
| 5,638,282 A | * | 6/1997 | Chazelle et al. ............... 701/301 |
| 6,005,581 A | * | 12/1999 | Gjullin .......................... 345/582 |
| 6,021,374 A | * | 2/2000 | Wood ............................ 701/301 |
| 6,088,634 A | * | 7/2000 | Muller et al. ....................... 701/9 |
| 6,088,654 A | * | 7/2000 | Lepere et al. ................. 701/301 |

(Continued)

FOREIGN PATENT DOCUMENTS

FR    1 598 718 A1    11/2005

*Primary Examiner* — Khoi Tran
*Assistant Examiner* — Bhavesh V Amin
(74) *Attorney, Agent, or Firm* — Lowe Hauptman Ham & Berner, LLP (57) ABSTRACT

The present invention relates to a method and a device for monitoring the minimum flying altitude of an aircraft. The method comprises a phase for calculating a vertical flight profile describing the changing altitude of the aircraft during an arbitrary period taking into account its instantaneous speed and its instantaneous angle of climb or descent; a phase for calculating a minimum vertical flight profile describing the changing minimum flying altitude over the future route of the aircraft during the period taking into account its instantaneous heading and its instantaneous speed, the minimum altitude values being determined for a coverage of the route of the aircraft during the period by disks centered on points on the route using requests to a database containing airspace zones corresponding to a minimum flying altitude, each request returning the zones intersected by a disk, the minimum altitude retained in a disk being the maximum value of the minimum altitudes for each type of zone returned; and a phase for generating a warning message based on the relative position of the vertical flight profile compared with the minimum vertical flight profile.

16 Claims, 6 Drawing Sheets

U.S. PATENT DOCUMENTS

| | | | |
|---|---|---|---|
| 6,092,009 A * | 7/2000 | Glover | 701/14 |
| 6,133,867 A * | 10/2000 | Eberwine et al. | 342/29 |
| 6,134,500 A * | 10/2000 | Tang et al. | 701/202 |
| 6,317,690 B1 * | 11/2001 | Gia | 701/301 |
| 6,421,603 B1 * | 7/2002 | Pratt et al. | 701/206 |
| 6,456,940 B1 | 9/2002 | Higgins | |
| 6,748,325 B1 * | 6/2004 | Fujisaki | 701/301 |
| 6,906,641 B2 * | 6/2005 | Ishihara | 340/946 |
| 6,995,690 B1 * | 2/2006 | Chen et al. | 340/974 |
| 7,120,540 B2 * | 10/2006 | Meunier | 701/301 |
| 7,209,052 B2 * | 4/2007 | Artini et al. | 340/970 |
| 7,321,812 B2 * | 1/2008 | Silberman et al. | 701/3 |
| 7,493,197 B2 * | 2/2009 | Bitar et al. | 701/14 |
| 7,672,758 B2 * | 3/2010 | Astruc | 701/16 |
| 2001/0023390 A1 * | 9/2001 | Gia | 701/301 |
| 2002/0030610 A1 * | 3/2002 | Ishihara et al. | 340/970 |
| 2007/0250223 A1 * | 10/2007 | Francois et al. | 701/9 |

* cited by examiner

METHOD AND A DEVICE FOR MONITORING THE MINIMUM FLYING ALTITUDE OF AN AIRCRAFT

CROSS-REFERENCE TO RELATED APPLICATIONS

The present application is based on, and claims priority from, French Application Number 06 02455, filed Mar. 21, 2006, the disclosure of which is hereby incorporated by reference herein in its entirety.

The present invention applies to the field of avionics and in particular systems for monitoring the risks of collision with the ground.

Terrain Awareness and Warning Systems (TAWS) provide the crew of aircraft with a certain level of knowledge of the relief being flown over. They include a digital terrain model, which is a raster representation of the surface of the Earth, each square of the grid being associated with the maximum altitude reached by the relief within the square. This maximum altitude of the relief within the square constitutes a floor altitude that must not be crossed. The main concern is to avoid collision with the ground, in approach maneuvers for example, audible and visual warnings being sent to the crew as appropriate. However, these warnings of approach to or proximity with the ground are extremely urgent in nature, while other criteria could be used to warn the crew earlier and thus give it more time to perform the appropriate avoidance maneuvers. Currently, an aircraft can, for example, pass below the minimum regulatory altitude of the air route that it is following without any indication mechanism being triggered. It is only when the aircraft risks collision with the ground that the crew is warned by the TAWS.

Various organizations distribute aeronautical databases concerning civil air navigation and containing, among other information, minimum altitudes to be observed locally.

For example, a published grid of minimum altitudes is known, called "grid-MORA" (MORA standing for Minimum Off-Route Altitude) covering nearly all of the Earth with an accuracy of 1 degree in latitude and longitude. These minimum altitudes guarantee a vertical safety margin relative to the relief and to the obstacles on the ground of 1000 feet for altitudes below 7000 feet and of 2000 feet above.

The aeronautical databases, which are in the ARINC-424 format, also list regulatory altitudes to be observed, in particular for the ceilings and floors of the air routes and in the vicinity of airports. They can also list preferential minimum altitude clearances issued by the major airlines.

Dedicated monitoring functions, possibly incorporated in the TAWS systems for monitoring the risks of collision with the ground, could use this minimum altitude data to trigger indication mechanisms far earlier than the warnings raised by the current TAWS. Unfortunately, being from various sources, the minimum altitude data is often redundant, sometimes mutually inconsistent, which makes it difficult to use for protection against the risks of collision with the ground.

In an attempt to exploit some of this data, U.S. Pat. No. 6,456,940 describes a method and a system to assist in navigation providing for the constant display of a minimum safe altitude. For this, it tries to exploit the airspace structure, which is the result of subdivision of the airspace into zones of various shapes. Each zone is characterized by a type, a type comprising the zones with the same operational function such as aid in approaching an airport, and each zone can be characterized by a floor altitude and/or a ceiling altitude according to its operational function. Unfortunately, only airspace zones imposing a regulatory floor altitude for aid in approaching airports are taken into account by this patent. Moreover, based on a raster representation of the surface of the globe, the accuracy is only to within the square of the grid currently being flown over or the next square. Therefore, a system according to this patent can sometimes indicate a minimum safe altitude that in fact is not applicable given the flight path. This can lead to unnecessary constraints, particularly in certain emergency situations.

The main aim of the invention is to overcome the above-mentioned drawbacks, by providing an effective way of using the minimum altitude data, and in particular by structuring this data in a way suited to the use made of it. In flight, this makes it possible to extract the minimum altitude data that is relevant at a precise instant based on the instantaneous position and speed of the aircraft, and inform the crew by any appropriate means of any drift. To this end, the object of the invention is a method of monitoring the minimum flying altitude of an aircraft. It comprises a phase for calculating a vertical flight profile describing the changing altitude of the aircraft during an arbitrary period taking into account its instantaneous speed and angle of climb or descent. It also comprises a phase for calculating a minimum vertical flight profile describing the changing minimum flying altitude over the future route of the aircraft during the period taking into account its instantaneous heading and speed. The minimum altitude values are determined for a coverage of the route of the aircraft during the period by disks centered on points on the route using requests to a database containing airspace zones corresponding to a minimum flying altitude. Each request returns the zones intersected by a disk, the minimum altitude retained in a disk being the maximum value of the minimum altitudes for each type of zone returned. It also comprises a phase for generating a warning message based on the relative position of the vertical flight profile compared with the minimum vertical flight profile. For example, the minimum altitude retained on the portions of the route covered by several disks can be the minimum value of the minimum altitudes for each disk.

Advantageously, the disks covering the future route of the aircraft can all have the same radius ensuring that any point within the width of the route is in at least one disk. The centers of the disks covering the future route of the aircraft can also be spaced in pairs at a distance ensuring that any point on the route is contained in at least two disks. The width of the route can, moreover, be dependent on the current flight phase.

Advantageously, here again, the requests to the database can return only the airspace zones having an operational interest relative to the heading followed by the aircraft with a tolerance about this heading. For example, an air route oriented perpendicularly relative to the heading is obviously not followed by the aircraft and therefore has no operational interest in the sense that the crew does not need to know it to provide its operational piloting function. The requests to the database can also return only the airspace zones having an operational interest relative to the current flight phase. For example, the zones for which the type characterizes an operational airport approach assistance function have no operational interest at cruising altitude, that is at high altitude.

The requests to the database can return separate squares covering the entire surface of the Earth, each square corresponding to a minimum flying altitude. The minimum altitude retained for this type of zone in the disk concerned can be the highest of the minimum altitudes of the squares returned. The requests to the database can also return circular zones divided into angular sectors, each angular sector having a minimum flying altitude associated with it. Such a circular zone is then returned only if it fully contains the disk concerned. The minimum altitude retained for the circular zone returned can be the highest of the minimum altitudes of its sectors intersecting the disk concerned and the minimum altitude retained for this type of zone in the disk concerned can be the lowest of the minimum altitudes of the circular zones returned. The requests to the database can also return air route segments, each segment corresponding to a minimum flying altitude in the outbound direction, a minimum flying altitude in the return direction and a segment width, a segment being returned only if it is oriented along the heading followed by the aircraft with a tolerance about this heading and if it fully contains the disk concerned. The minimum altitude retained for this type of zone in the disk concerned can be the lowest of the minimum altitudes of the segments returned. The requests to the database can also return restricted access zones, each zone corresponding to a minimum flying altitude. The minimum altitude retained for this type of zone in the disk concerned can be the lowest of the minimum altitudes of the restricted access zones returned.

Another object of the invention is a device for monitoring the minimum flying altitude of an aircraft implementing the abovementioned method. It comprises a module for calculating a vertical flight profile of the aircraft based on kinematic data supplied by a navigation module. It also comprises a module for calculating a minimum vertical flight profile based on kinematic data supplied by the navigation module and based on minimum altitude data supplied by a minimum flying altitude database. It also comprises a module for determining the relative position of the vertical flight profile compared with the minimum vertical flight profile. It also comprises an audible and/or visual indication module for sending a warning message to the crew if the vertical flight profile falls below the minimum vertical flight profile.

Advantageously, a message can be sent to the crew if the vertical flight profile falls below the minimum vertical flight profile for a flying duration greater than a certain period or above a certain altitude threshold.

In one embodiment, the relative position of the vertical flight profile compared with the minimum vertical flight profile can be determined according to certain criteria at regular time intervals, the result of the latest determination being memorized and a warning message being sent to the crew if the value of the result changes. The criteria characterizing the relative position of the vertical flight profile compared with the minimum vertical flight profile can depend on the last result memorized and make it possible to limit the successive alternating of the result between two values.

Advantageously, a man-machine interface module can be used to disable the sending of warning messages to the crew.

The advantage of the invention is that it considerably reduces the size of the onboard database, which becomes more compact. The latter can change from a size of the order of 100 megabytes for minimum altitude data that is not always useful and can present gaps, to 3 megabytes only for altitude data that is comprehensive and consolidated worldwide, really useful, and in particular with all the air routes. The missing zones can be made up with data from the digital terrain model. The air routes can also be consolidated with respect to the radio range and mountain chains. Locally, this can make it possible to fly lower without risk and be able to manage certain emergency situations with greater flexibility. Thus, the inventive solution does not require unusual disk space or memory space capacity. It can be implemented on most current systems without software or hardware upgrading. Apart from parameterizing, such as the interval between calculations which is a function of the host architecture, the inventive solution allows for processing times suited to so-called "pseudo-real-time" constraints. This is mainly due to the fact that all the data manipulated comprises simple geometrical objects on which there are no spherical geometry operations to be performed, for example great-circle routes. On the current systems for example, it is easy to envisage the method according to the invention being applied every second as the aircraft is moving. However, this can be adapted to the performance characteristics of the system and of the aircraft.

Other characteristics and advantages of the invention will become apparent from the description that follows, given in light of the appended drawings which represent.

Figure 1:
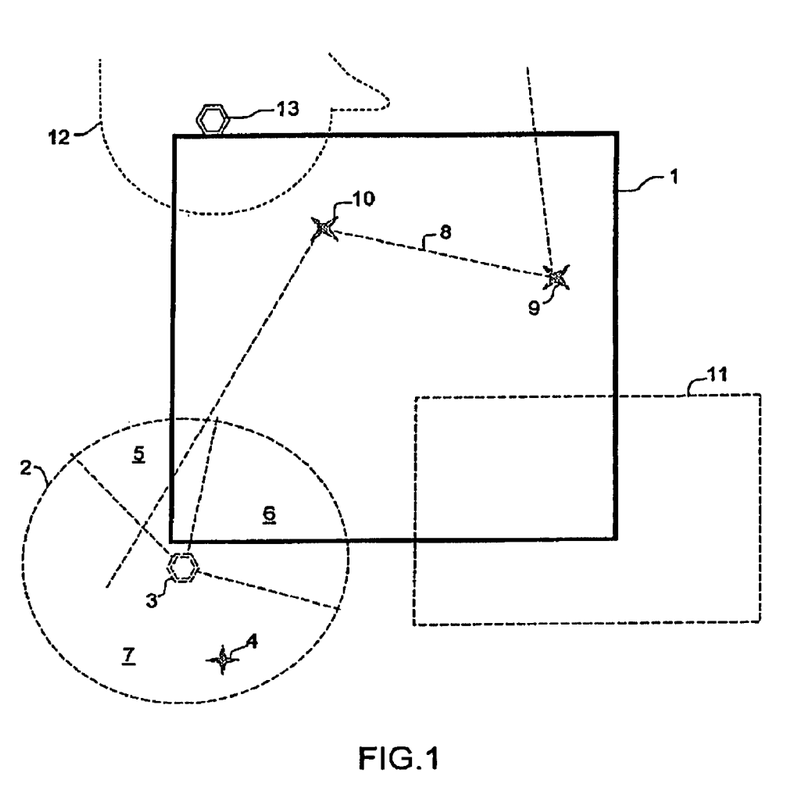
FIG. 1, by a synoptic diagram, examples of aeronautical data manipulated by the method according to the invention, FIG. 2, by a synoptic diagram, exemplary geometrical representations of aeronautical data manipulated by the method according to the invention and their spherical projection, FIG. 3, by a synoptic diagram, a spherical projection illustration of an air route segment manipulated by the method according to the invention, FIGS. 4a and 4b, by two synoptic diagrams, an exemplary vertical flight profile according to the invention, FIGS. 5a and 5b, by two synoptic diagrams, an exemplary minimum vertical flight profile according to the invention, FIGS. 6a, 6b and 6c, by three synoptic diagrams, exemplary relative positions of a vertical flight profile compared with a minimum vertical flight profile, FIG. 7, by a synoptic diagram, an exemplary software and hardware architecture implementing the method according to the invention.

FIG. 1 uses a synoptic diagram to illustrate examples of aeronautical navigation data. The data is obtained from data sources available in a very wide variety of formats. It must be subjected to a process to make it uniform, for example using a pivot format like XML, which is a standard meta-language used to describe all kinds of data.

In FIG. 1, the rectangular shapes of a tile 1 of the "grid-MORA" can be distinguished, as can a zone 11 denoted by the expression "Special Use Airspace", hereinafter abbreviated SUA. There can also be distinguished the circular sectorized shape of a zone 2 denoted "Minimum Sector Altitude", hereinafter abbreviated MSA. Finally, the circular shape of a portion of another SUA 12 can be distinguished. It should be noted that the SUAs are defined by a succession of segments and arcs centered on defined positions in the navigation databases. Thus, their geometry can be extremely irregular, which is particularly well illustrated by the SUA 12.

For a tile 1 of the grid-MORA, measuring 1 degree of latitude by 1 degree of longitude, a safe altitude value, expressed as "Air Mean Sea Level", hereinafter abbreviated AMSL, is normally published to guarantee a vertical margin with the relief of 1000 feet for altitudes below 7000 feet and 2000 feet above that. The grid-MORA data is published by the states concerned and appears again in the "AS" section of the ARINC-424 navigation databases. Some tiles have no associated safe altitude, which is why the "grid-MORA" is often considered to be incomplete. To implement the method according to the invention, the latitude and longitude coordinates of the South-West corner of the tile 1 are stored in XML format, together with the AMSL altitude of the tile if it is known.

An MSA 2 is a disk centered on a reference point 3 associated with an airport zone 4. It is defined by a list of altitudes defined for angular segments 5, 6 and 7 centered on the reference position 3. Depending on the case, the reference position 3 can be the airport reference point, which is not the case in FIG. 1, or a radio-navigation aid located nearby, or even a point near to the airport referenced in an aeronautical database. The MSAs are published by the airports concerned and also appear in the "PS" section of the ARINC-424 navigation databases. Among other things, to implement the method according to the invention, the codes of the International Civil Aviation Organization, hereinafter abbreviated ICAO, and the latitude and longitude coordinates of the airport and of the reference point are stored in XML format, as is the radius of the MSA, the list of its angular sectors and of the associated AMSL altitudes.

In the horizontal plane, an air route 8 is published in the form of a series of great-circle segments linking, among other things, points 9 and 10 referenced in the aeronautical databases. A great-circle route is the shortest path to go from one point to another on the surface of the Earth. In the vertical plane, an air route is defined by a maximum flying altitude and two minimum flying altitudes, one in each direction of travel. The air routes are published by the ICAO and also appear in the "ER" section of the ARINC-424 navigation databases. Among other things, to implement the method according to the invention, the ICAO code of the air route and the ICAO codes and the latitude and longitude coordinates of the points referenced in the order of travel are stored in XML format. Similarly, the segment width, denoted "Required Navigation Performance" and hereinafter abbreviated RNP, which is the maximum distance in nautical miles that the aircraft can move either side of the air route, without forgetting the minimum flying altitudes in each direction, is stored in XML format. Particular air routes, denoted "Preferred routes", are also published to favor the lines of access to certain geographic zones like North America, Australia or the trans-oceanic routes. They are published by the ICAO and also appear in the "ET" section of the ARINC-424 navigation databases.

SUA type zones 11 and 12 delimit the geographic perimeters beyond which access is prohibited, restricted or regulated. In the horizontal plane, an SUA is defined by a succession of segments and arcs centered on positions defined in the navigation databases, such as a position 13. In the vertical plane, an SUA is defined by a high altitude limit and a low altitude limit. In time, the SUAs are defined by activation periods. The SUAs are available in the "UR" section of the ARINC-424 navigation databases. They are also available in the DAFIF ("Digital Aeronautical Flight Information File") databases. Among other things, to implement the method according to the invention, the following are stored in XML format: the ICAO code and the name of the zone, the bottom vertical limit in the zone, the latitude and longitude coordinates, the radii and the azimuths used to define the geometry of the zone.

The process described here allows the conditional addition of data supplied by the airlines in order to be able to incorporate their operating constraints, such as the "Company Routes", the extensions of the flight minima required to operate certain air routes or the adaptations of the approach to certain airports. For example, the "Company Routes" are routes defined by the airlines for the airports they serve. They define the take-off procedures, the air routes used and the favored approaches. They are published by the airlines in ARINC-424 format and also appear in the "R" section of that same navigation database. Among other things, to implement the method according to the invention, the airline code of the route, the airport of departure, the airport of arrival, the elements constituting the route concerned and the cruising altitude on that route are stored in XML format.

Figure 2:
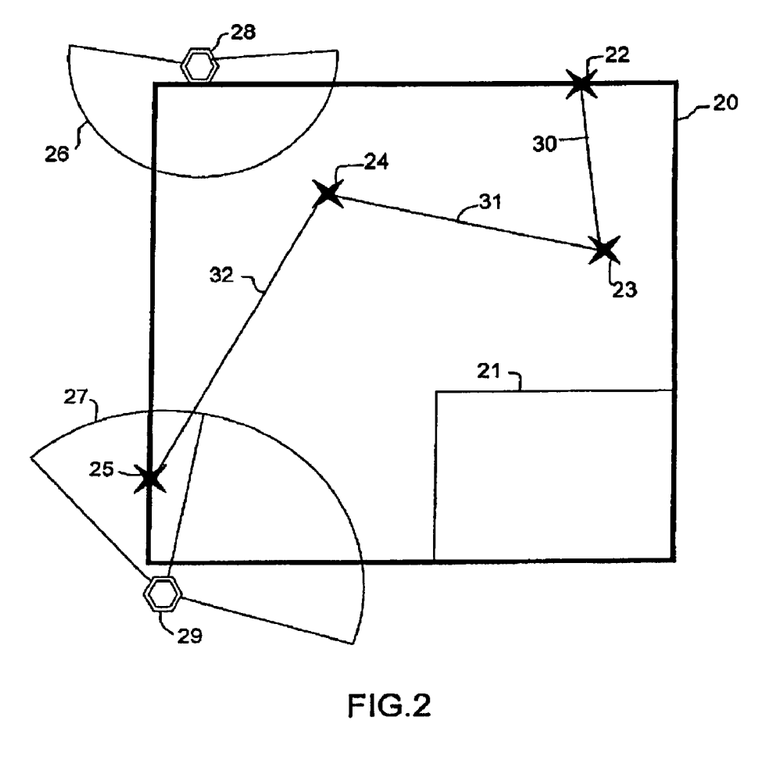

FIG. 2 uses a synoptic diagram to illustrate exemplary geometric representations of aeronautical data manipulated by the method according to the invention, in particular those of the aeronautical data illustrated by FIG. 1. This is information obtained from the aeronautical data converted into geo-referenced geometrical shapes, retaining a reference to the initial aeronautical data to which it belongs. All the heading and azimuth data is converted into geographic heading.

Cells 20 and 21 are each defined by a rectangle, the sides of which are colinear with the meridians and the parallels. The cells 20 and 21 are respectively defined based on the initial aeronautical data that is the tile 1 (FIG. 1) of the grid-MORA and its intersection with the SUA 11 (FIG. 1) referenced according to the meridians and the parallels. The cells 20 and 21 are represented by the latitude/longitude coordinates of the South-West corner of the cell, by the latitude/longitude coordinates of the North-East corner of the cell, by the altitude of the cell, by the altitude reference of the cell, namely AMSL, AGL ("Air to Ground Level") or FL ("Flight Level"), and finally by a reference to the initial aeronautical data that is the tile 1 or the SUA 11 (FIG. 1).

Fixed points 22, 23, 24 and 25 are each defined by a position geo-referenced in latitude/longitude and a reference to the initial aeronautical data that is the air route 8 (FIG. 1) or one of the points referenced 9 or 10 that it links. The fixed points 23 and 24 correspond to the points referenced 9 and 10 of the air route 8, the fixed points 22 and 25 correspond to the ends of the segments of the air route 8 in the tile 1. Fixed points can also be defined from referenced points of the "Preferred Routes" or "Company Routes", based on the centers of the MSA or SUA sectors, or even on the vertexes describing the contours of the SUAs.

The sectors 26 and 27 are respectively centered on geo-referenced positions 28 and 29, and are each limited by a radius and two bearings. The sectors 26 and 27 correspond to the aeronautical data that is the circular portion of the SUA 12 centered on the point 13 and the MSA 2 centered on the point 3 (FIG. 1). The sectors are represented by a referenced point, a radius, two azimuths forming the left and right limit in the forward trigonometrical direction, an altitude accompanied by an altitude reference AMSL, AGL or FL, and a reference to the initial aeronautical data that is the SUA 12 and the MSA 2.

Segments 30, 31 and 32 are defined based on the air route 8 (FIG. 1) by a straight-line segment on a great-circle route, located by its geo-referenced ends and a width expressed as a Euclidian distance relative to the segment. Segments can also be defined based on segments of the "Preferred Routes" or segments of the "Company Routes". The segments are represented by a fixed segment start point, a fixed segment end point, a segment width, a segment altitude, an AMSL, AGL or FL altitude reference, a reference to the fixed points 9 and 10 of the ends and a reference to the air route 8. The segments exhibiting different altitudes in both directions have a single geometrical representation. The use of the minimum flying altitude according to the direction of travel is obtained by accessing the corresponding aeronautical data information.

Convex polygons can be defined by an ordered series of vertexes in the forward trigonometrical direction, defined by their latitude/longitude position. The convex polygons are defined based on the aeronautical data that is the SUA parts that cannot be represented by cells or sectors. The convex polygons are represented by a bottom and top vertical limit, an AMSL, AGL or FL bottom and top altitude reference, and a reference to the initial aeronautical data.

Some aeronautical data, duplicated in the various data sources, also has its geometrical representation duplicated. Two criteria make it possible to locate the duplicated data: the identifier, that is, the reference of the aeronautical data item, and its geometry. For example, on the basis of their identifier, segments common to several air routes and identified by their referenced end points can be located. MSAs centered on the same position but having different sectors can also be located. Also for example, based on their geometry, SUAs represented in several source databases, ARINC-424 and DAFIF covering the same geographic zone, for example, can be located. Sectors included in several SUAs can also be located.

FIG. 2 also illustrates the spherical projection of the geometric representations manipulated by the method according to the invention. The objective is to project all the information geo-referenced in latitude/longitude onto a spherical grid covering the whole of the planet, by establishing the list of the geo-referenced shapes that are wholly or partly included in each of the cells of the grid. The projection grid is defined with a tile resolution of 1 degree of latitude by 1 degree of longitude, the zone covered is [S:90; N:90] and [W:180; E:180]. Each tile of the grid contains a list for each type of geometric representation previously described, namely the cells, the fixed points, the sectors, the segments and the convex polygons. These types of geometric representation are hereinafter called "geometric object classes" and, by language extension, the terms "cell class", "sector class", "segment class" and "polygon class" can be applied. Also by extension, the term "object" will be used to denote any geometric representation instance in a class of geometrical objects. Thus, each class has associated with it a list of objects in that class, the lists being contained by the tiles of the projection grid.

For each tile, the list of objects of the cell class contains a cell for the applicable grid-MORA and the SUA cells intersecting the current tile. Thus, the list of the cells of the tile 1 contains the cells 20 and 21.

The list of objects of the sector class contains the MSA sectors having an intersection with the tile and the SUA sectors having an intersection with the tile. Thus, the list of the sectors of the tile 1 contains the sectors 26 and 27.

Figure 3:
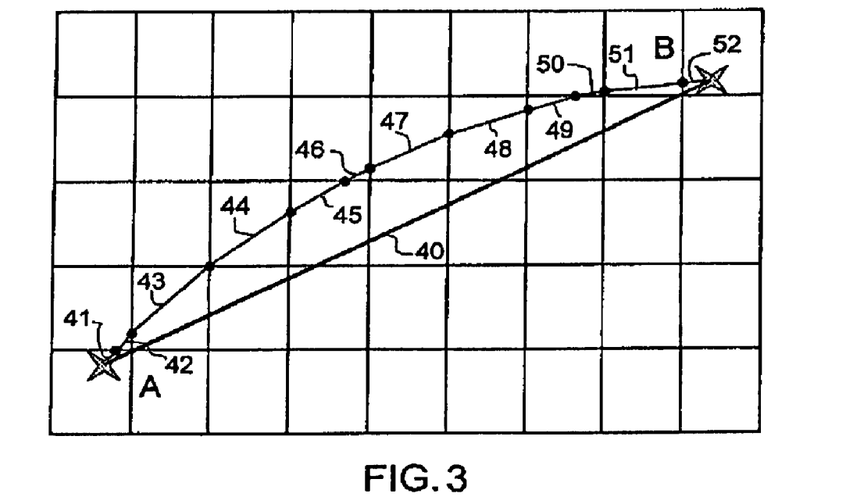

The list of objects of the segment class contains the segments of the air routes, of the "Preferred Routes" and of the "Company Routes" having an intersection with the current tile, bounded at the limits of the tile. The half-width of the segments to be considered to evaluate an intersection is, for example, fixed at 10 nautical miles either side of the segment described by the aeronautical data item. As illustrated by FIG. 3 with two points A and B, the path between two points defining the ends of a segment is divided up between the tiles by assuming that the paths described by the air routes are great-circle routes. Thus, a segment 40 represents the shortest path between the two points A and B in Euclidian geometry on a Mercator representation, whereas the series of segments 41, 42, 43, 44, 45, 46, 47, 48, 49, 50, 51 and 52 represents the shortest path between A and B in spherical geometry. It is this latter representation, far more true to reality, which is retained here for implementing the invention. Thus, the list of the segments of the tile 1 contains the list of the great-circle route segments corresponding to the segment 30 (FIG. 2), the list of the great-circle route segments corresponding to the segment 31 and the list of the great-circle route segments corresponding to the segment 32. The great-circle route segments are calculated by a method well known elsewhere.

The points of intersection of the segments with the edges of the tile are added to the list of fixed points. Thus, the list of the fixed points of the tile 1 contains the points 22, 23, 24 and 25.

For each tile, the list of objects of the polygon class contains the polygons of the SUAs having an intersection with the current tile, bounded at the limits of the tile. The constraints on the boundaries of the sides of the polygons at the edges of the tiles are identical to those described for the subdividing of the segments. The list of the polygons of the tile 1 (FIG. 1) contains the polygon 21.

According to the standard aeronautical databases, such as the Jeppesen database or the EAG database for example, the minimum altitude value applicable to an air route segment is obtained from the maximum height of the terrain recorded in the rectangle with a half-width of 10 nautical miles centered on the segment. This minimum applicable altitude guarantees a margin relative to the relief of 2000 feet for the reliefs above 5000 feet and 1000 feet for the reliefs below 5000 feet in AMSL. The terrain databases used to determine these values often have missing zones and mediocre accuracy, in any case greater than 30" of angle when moving away from the airports. Consequently, if more comprehensive and/or more accurate terrain data is available, then the minimum altitude values can be re-estimated by applying the same rule of the rectangle with a half-width of 10 nautical miles centered on the segment and with the same margins. Similarly, the grid-MORA has cells of 1 degree by 1 degree for which there is no value published by the states: South polar ice cap, a part of Alaska and of the South Pacific. According to the definition of the grid-MORA, the minimum applicable value must guarantee a margin relative to the relief of 2000 feet for the reliefs above 5000 feet and 1000 feet for the reliefs below 5000 feet in AMSL. The values missing from the grid-MORA can be obtained from the maximum altitude value recorded in the database that is available if the latter has a world coverage consolidated to 30" of arc.

For example, the data generated previously can be used to feed a minimum altitude database, the data being accessible by suitable means. The figures that follow describe a monitoring method embedded in a TAWS type device and using such a database. The method aims to detect and indicate conditions in which an aircraft is locally approaching the minimum flying altitude. The operational objective of the function is for the crew to be aware of this situation and consider the corrective maneuvers if necessary. The general principle consists in extrapolating the speed vector of the aircraft over a certain period of time to estimate its route, constructing the profile of the minimum altitudes along that route, checking whether the predicted positions during this time period are below the local minimum flying altitudes and, where appropriate, generating an audio and/or graphic message according to the situation. Moreover, the function can be based on evaluating the operational situation of the aircraft in order to improve the relevance of the information supplied to the crew. For example, states characterizing the flight phase can be as follows: taking off/approaching, climbing/descending and cruising. In practice, depending on the current state, certain aeronautical data will not be relevant: the MSAs, which are linked to an airport, are not relevant in the cruising phase, which is a very high altitude flight phase. Thus, an access means suited to the minimum altitude database as described previously can be that the flight phase is one of the database request parameters. Entering the "cruising" value in a request then precludes the latter returning an MSA. However, the MSAs are particularly relevant in the taking-off/approaching phases and in the climbing/descending phase. The MSAs must therefore be returned by the requests having received the "taking off/approaching" or "climbing/descending" values as parameters.

Figure 4A:
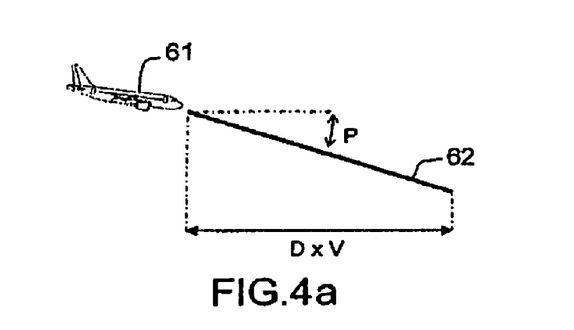
Figure 4B:
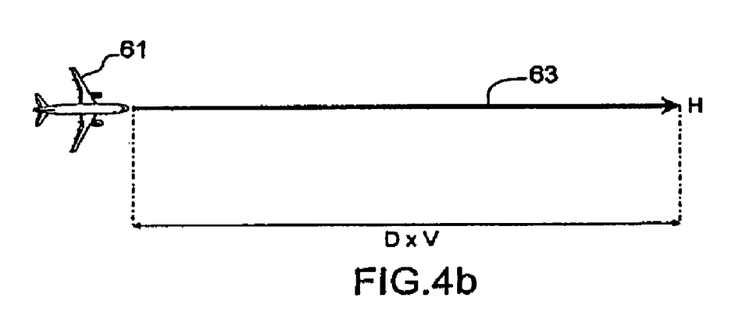

FIGS. 4a and 4b are two synoptic diagrams illustrating an exemplary vertical flight profile according to the invention. The vertical flight profile according to the invention describes the changing altitude of the aircraft with a certain time horizon.

FIG. 4a illustrates a path 62 of an aircraft 61 in the vertical plane. In this vertical plane, the vertical flight profile of the aircraft 61 is defined by the two instantaneous values that are the angle of climb P of the path 62 of the aircraft and the current ground speed V of the aircraft, both assumed constant for an extrapolation time period D.

FIG. 4b illustrates the example of FIG. 4a in the horizontal plane. In this horizontal plane, the trajectory 62 has a corresponding current heading H of the aircraft, which defines a route 63 if the ground speed V and the heading H of the aircraft are both assumed constant for the extrapolation time period D. For example, the time period D can be arbitrarily set at 30 seconds.

Figure 5A:
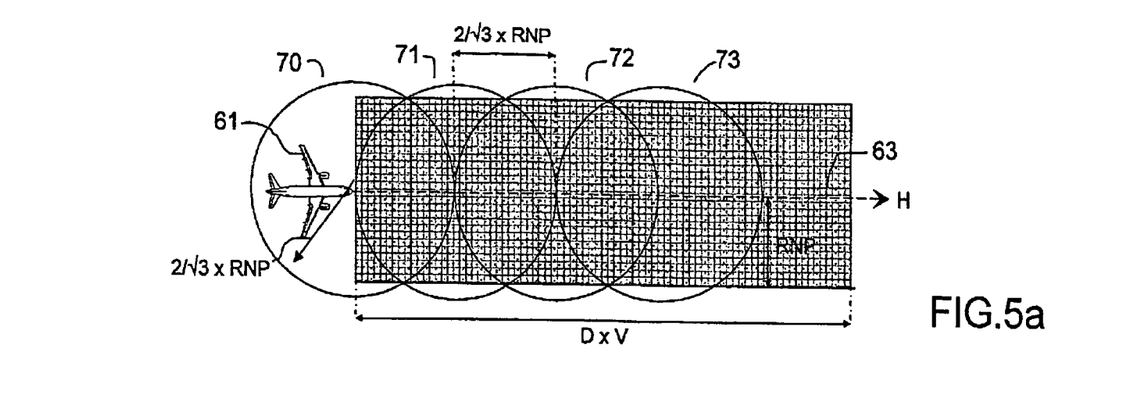
Figure 5B:
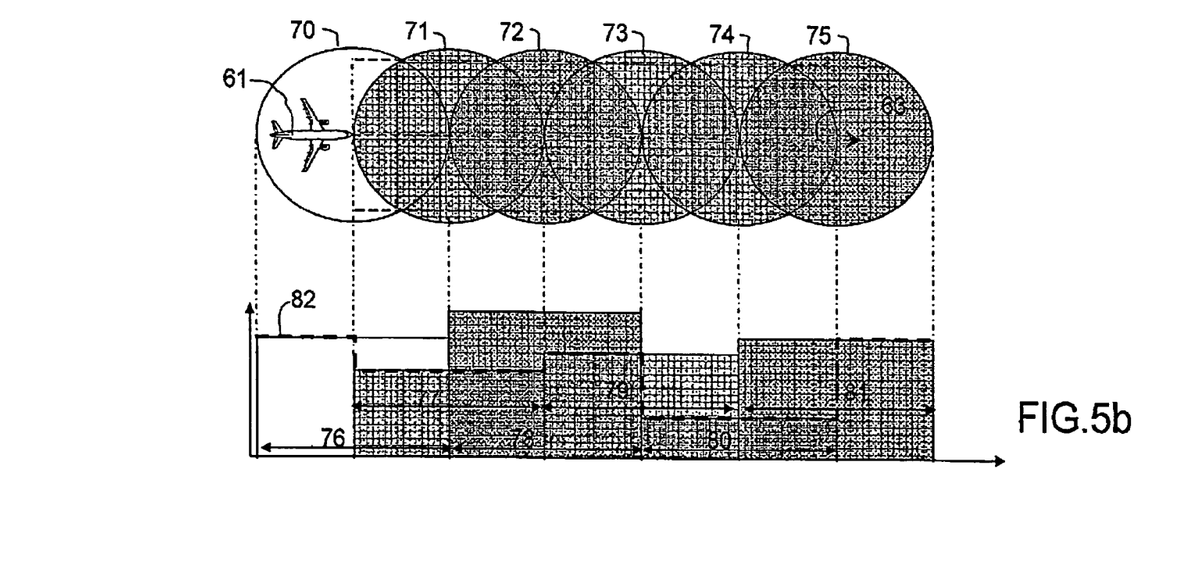

FIGS. 5a and 5b are two synoptic diagrams illustrating an exemplary minimum vertical flight profile according to the invention. The minimum vertical flight profile according to the invention describes the minimum altitude levels over the route of the aircraft with a certain time horizon.

FIG. 5a illustrates the same route 63 in the horizontal plane as that illustrated previously by FIG. 4b, the aircraft 61 following the heading H at the ground speed V for an extrapolation time period D. However, in FIG. 5a, the route 63 is also covered distance-wise by the disks 70, 71, 72 or 73, the centers of which are separated by a certain sampling interval from the route. Advantageously, the sampling interval is fixed in order for the radius of any disk to coincide with the center of the next disk, the radii of the disks being fixed so that their intersections are at a distance equal to the width of the route. Where appropriate, the width concerned can be the pre-defined RNP of the air route being followed. However, advantageously, the width concerned can be adapted to the flight phase, for example 0.5 nautical miles in the taking-off/approaching phase, 1 nautical mile in the climbing/descending phase and 1.5 nautical miles in the cruising phase. This corresponds to an interval between the centers of the disks and a radius of the disks equal to 2/√3 multiplied by the width of the route.

FIG. 5b illustrates, for each of the disks 70, 71, 72, 73, 74 and 75 along the route 63, the minimum altitude value retained in the disk, which is the maximum value of the minimum flying altitudes calculated for each type of zone considered and extracted, for example, from the database. Access to the minimum flying altitudes database can be obtained through an interface making it possible to describe an extraction disk corresponding to the coverage disks, to describe a route to be considered advantageously corresponding to the heading H with a tolerance, and describe zone types that are advantageously relevant according to the flight phase. The minimum altitude values retained will then be added to a histogram which gives the altitude on the Y axis as a function of the distance on the X axis.

For the grid-MORA tiles, if the disk intersects several tiles of 1 degree by 1 degree in latitude and longitude extracted advantageously from the database, the value retained is the maximum altitude of the tiles concerned. For the air routes advantageously extracted from the database, an air route segment is considered only if, on the one hand, the route 63 of the aircraft is in the axis of the air route, to within 10° for example, and only if the disk concerned is entirely contained within the width of the air route on the other hand. The minimum altitude value retained in the disk is the minimum altitude of the air route segments concerned. For the MSAs advantageously extracted from the database, an MSA is considered only if the disk is entirely contained within the radius of the MSA. If the disk overlaps several segments of one and the same MSA, the minimum altitude value retained for this MSA is the maximum altitude of the sectors concerned. The minimum altitude value retained in the disk for all the MSAs is the minimum altitude of the altitudes calculated for each MSA. For the restricted access zones advantageously extracted from the database, the minimum altitude retained in the disk is the minimum altitude of the restricted access zones concerned.

In the histogram, one bar 76 represents the minimum altitude value associated with the disk 70, one bar 77 represents the minimum altitude value associated with the disk 71, one bar 78 represents the minimum altitude value associated with the disk 72, one bar 79 represents the minimum altitude value associated with the disk 73, one bar 80 represents the minimum altitude value associated with the disk 74, one bar 81 represents the minimum altitude value associated with the disk 75. A minimum vertical flight profile 82, shown by broken lines in FIG. 5b, is obtained by concatenating, over the development by distance, the minimum altitude values for each of the disks along the route 63. For the overlap zones, it is the minimum value of the minimum altitudes that is retained.

The vertical flight profile of FIG. 4a still has to be compared with the minimum vertical flight profile of FIG. 5b to determine whether the situation is abnormal and, if necessary, decide to generate a message to the crew.

Figure 6A:
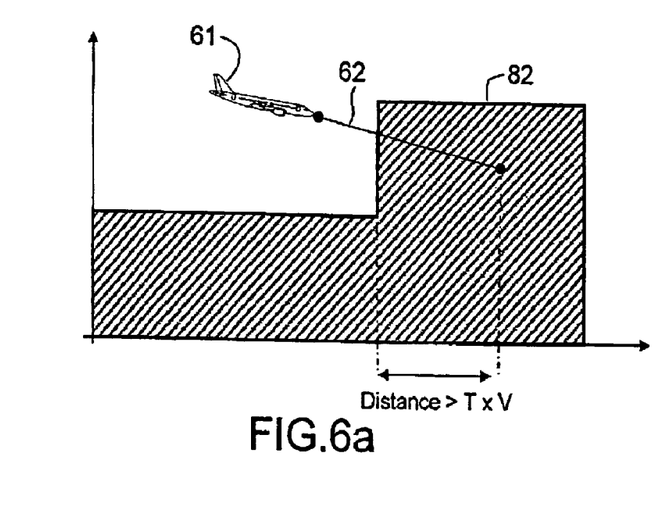
Figure 6B:
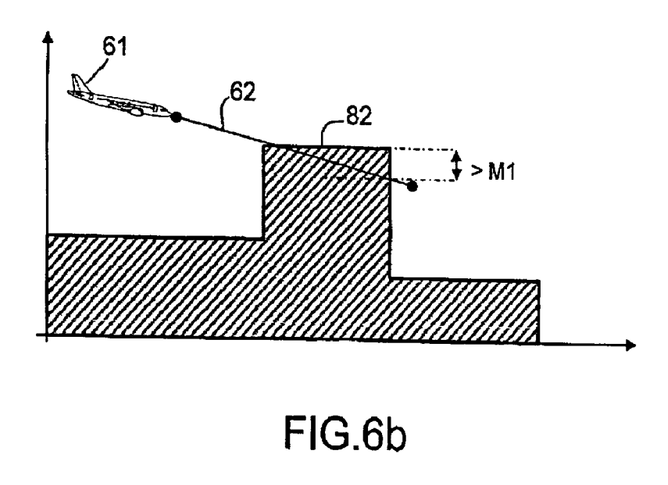
Figure 6C:
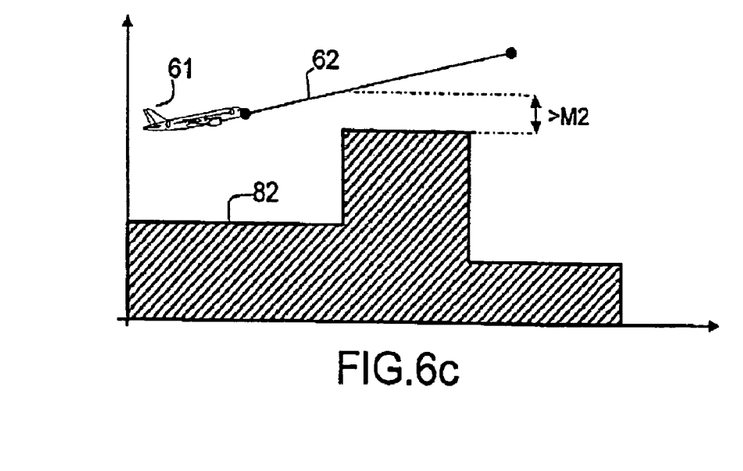

FIGS. 6a, 6b and 6c are three synoptic diagrams illustrating exemplary relative positions of the vertical flight profile 62 of the aircraft 61 compared with its minimum vertical flight profile 82 described previously.

FIGS. 6a and 6b also illustrate an activation logic for the generation of indication messages warning the crew. It relies on two trigger conditions, one in terms of time and the other in terms of vertical margin.

FIG. 6a illustrates the time condition, which is advantageously satisfied when at least n samples of the vertical flight profile, arbitrarily sampled at intervals of P seconds, are below the minimum vertical flight profile. As illustrated in the figure, this amounts to stating that a message is generated when the aircraft is about to fly below the minimum vertical flight profile for a time longer than T=P×n, which corresponds to a flying distance greater than T×V.

FIG. 6b illustrates the vertical margin condition, which is advantageously satisfied as soon as at least one point of the vertical flight profile is located more than M1 feet below the minimum vertical flight profile. The value of the margin M1 depends on the altitude of the point concerned. For example, depending on whether this altitude is greater than or less than a limit value of 5000 feet, the margin M1 can respectively be 2000 feet or 1000 feet.

FIG. 6c also illustrates a disabling logic for the generation of indication messages to the crew. It relies on a vertical margin condition, which is satisfied as soon as, for any evaluated point of the vertical flight profile, as soon as the altitude difference with the minimum vertical flight profile is greater than a margin M2, 400 feet for example.

The activation and disabling logics for the generation of messages can advantageously include a hysteresis filter to avoid successive activations/disabling when flying in conditions at the triggering limits. For example, such a filter can be implemented using a finite state machine. Each state of the state machine characterizes a summary warning situation of the vertical flight profile compared with the minimum vertical flight profile and the transitions of the state machine for leaving a warning state are advantageously not triggered on events that are simply opposite to those having allowed admission to this state. The events triggering a transition to leave a warning state are more exacting than those having allowed admission to it. For example, this can provide a way of avoiding having light warning signals blinking at the start of warning and end of warning.

In certain cases, particularly in approaches, there is no point in displaying messages to the crew. An additional disabling mechanism can advantageously prevent the transmission, but without changing the operation of the state machine. In this way, if the pilot leaves the disabling conditions of the approach, a message can be generated immediately, without returning via a particular state of the state machine. The conditions of this disabling can depend on the activation/deactivation of certain systems, the state of the landing gear or even the geographic proximity of the aircraft to an airport.

Figure 7:
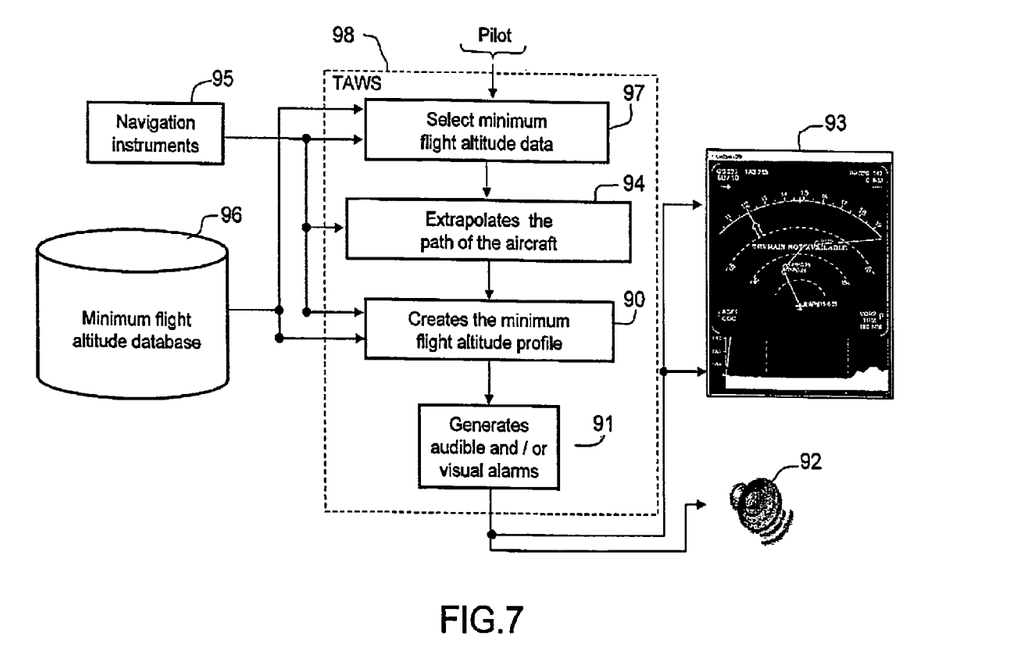

FIG. 7 is a block diagram illustrating an exemplary software and hardware architecture implementing the method according to the invention, within a TAWS 98. A man-machine interface device 97 enables the pilot at least to activate or disable the minimum altitude monitoring function, for example a two-position switch. In one, more complex, embodiment, the device 97 can also allow for the selection of usable data in the database or the selection of a graphic representation mode. When the minimum altitude monitoring function is activated, a software module 94 can calculate the vertical flight profile of the aircraft from the flight data such as the position, the speed and the altitude, supplied by navigation instruments 95. A software module 90 can calculate the minimum vertical flight profile using the minimum altitude data supplied by a minimum flying altitude database 96, such as the grid-MORA, the MSAs, the air routes and the SUAs. The database 96 offers data, a structure and requests particularly well suited to use by the software module 90. The module 90 then compares the minimum vertical flight profile with the vertical flight profile. The information can be presented to the pilot in the form of audio messages. For example, the software module 90 can generate messages to a module 91 responsible for managing warnings, messages comprising a message type, a number of repeats, a period between repeats, a sound level and a new message boolean. A device 92 responsible for generating sounds activates, for example, a message when the message is the highest priority out of those present, when the number of repeats is not zero and when the period between repeats has elapsed. In some cases, the minimum flying altitude information can be presented to the pilot using a display console 93, of the "Navigation Display" type, to present an activation position in the horizontal plane and/or "Vertical Display" to present a triggering altitude in the vertical plane, with a single repeat.

The invention makes it possible in particular to considerably reduce the size of the onboard database, which becomes more compact. The latter can be reduced from a size of around 100 megabytes for minimum altitude data that is not always useful and can have gaps, to only 3 megabytes for altitude data that is comprehensive and consolidated on a world scale, really useful, and in particular with all the air routes. The missing zones can be made up with data from the digital terrain model. The air routes can also be consolidated with respect to the radio range and mountain chains. Locally, this can make it possible to fly lower without risk and be able to manage certain emergency situations with far greater flexibility. Thus, the inventive solution does not require any unusual disk space or memory space capacity. It can be implemented on most current systems without software or hardware upgrading. Apart from the parameterizing, such as the interval between calculations which is dependent on the host architecture, the solution of the invention allows for processing times suited to so-called "pseudo-real-time" constraints. This is mainly due to the fact that all the data manipulated comprises simple geometric objects on which there are no spherical geometry operations to be performed, for example great-circle routes. On the current systems, for example, it is easy to envisage the method according to the invention being applied once a second while the aircraft is moving. But that can be tailored to the performance characteristics of the system and of the aircraft.

The invention claimed is:

1. A method for monitoring the minimum flying altitude of an aircraft, comprising:
    calculating on processor a vertical flight profile describing the changing altitude of the aircraft during an arbitrary period taking into account its instantaneous speed (V) and its instantaneous angle of climb or descent;
    a phase for calculating a minimum vertical flight profile describing the changing minimum flying altitude over the future route of the aircraft during the period taking into account its instantaneous heading and its instantaneous speed, the minimum altitude values being determined for a coverage of the route of the aircraft during the period; and
    a phase for generating a warning message based on the relative position of the vertical flight profile compared with the minimum vertical flight profile,
    wherein
    the coverage of the route is provided by disks centered on points on the route, the radii of the disks ensuring that any point within the width of the route is contained in at least one disk, requests to a database including airspace zones returning the zones intersected by each of the disks, each zone corresponding to a minimum flying altitude, the minimum altitude retained in a disk being the maximum value of the minimum altitudes for each type of zone returned,
    the requests to the database return only the airspace zones having an operational interest relative to the heading followed by the aircraft with a tolerance about this heading, and
    the requests to the database return air route segments, each segment corresponding to a minimum flying altitude in the outbound direction, to a minimum flying altitude in the return direction and to a segment width, a segment being returned only if it is oriented along the heading followed by the aircraft with a tolerance about this heading and if it fully contains the disk concerned, the minimum altitude retained for this type of zone in the disk concerned being the lowest of the minimum altitudes of the segments returned.

2. The method as claimed in claim 1, wherein the minimum altitude retained over the portions of the route covered by several disks is the minimum value of the minimum altitudes for each disk.

3. The method as claimed in claim 1, wherein all the disks covering the future route of the aircraft have a same radius.

4. The method as claimed in claim 3, wherein the centers of the disks covering the future route of the aircraft are spaced in pairs at a distance ensuring that any point on the route is contained in at least two disks.

5. The method as claimed in claim 3, wherein the width of the route is dependent on the current flight phase.

6. The method as claimed in claim 1, wherein the requests to the database return only the airspace zones having another operational interest relative to the current flight phase.

7. The method as claimed in claim 1, wherein the requests to the database return separate squares covering the surface of the Earth, each square corresponding to a minimum flying altitude, the minimum altitude retained for this type of zone in the disk concerned being the highest of the minimum altitudes of the squares returned.

8. The method as claimed in claim 1, wherein the requests to the database return circular zones divided into sectors, each sector corresponding to a minimum flying altitude, a circular zone being returned only if it fully contains the disk concerned, the minimum altitude retained for the circular zone returned being the highest of the minimum altitudes of its sectors intersecting the disk concerned and the minimum altitude retained for this type of zone in the disk concerned being the lowest of the minimum altitudes of the circular zones returned.

9. The method as claimed in claim 1, wherein the requests to the database return restricted access zones, each zone corresponding to a minimum flying altitude, the minimum altitude retained for this type of zone in the disk concerned being the lowest of the minimum altitudes of the restricted access zones returned.

10. A device for implementing the method as claimed in claim 1, comprising:
   a module for calculating the vertical flight profile of the aircraft based on the kinematic data supplied by a navigation module;
   a module for calculating the minimum vertical flight profile by coverage of the route of the aircraft by disks, based on the kinematic data supplied by the navigation module and based on the minimum altitude data supplied by a database containing airspace zones corresponding to minimum flying altitudes;
   a module for determining the relative position of the vertical flight profile compared with the minimum vertical flight profile; and
   an audible and/or visual indication module for sending a warning message to the crew if the vertical flight profile falls below the minimum vertical flight profile.

11. The device as claimed in claim 10, wherein the audible and/or visual indication module sends a message when the vertical flight profile falls below the minimum vertical flight profile for a flying duration greater than a given period.

12. The device as claimed in claim 10, wherein the audible and/or visual indication module sends a message when the vertical flight profile falls below the minimum flight profile above a given altitude threshold.

13. The device as claimed in claim 10, wherein the audible and/or visual indication module sends a message when the relative position of the vertical flight profile compared with the minimum vertical flight profile changes, the relative position being determined at regular time intervals according to given criteria.

14. The device as claimed in claim 13, wherein the criteria used by the audible and/or visual indication module for regularly characterizing the relative position of the vertical flight profile compared with the minimum vertical flight profile depend on the preceding result and make it possible to limit the successive alternating of the result between two values.

15. The device as claimed in claim 10, wherein it comprises a man-machine interface module that can be used to disable the sending of warning messages to the crew.

16. The method as claimed in claim 4, wherein the width of the route is dependent on the current flight phase.

\* \* \* \* \*